(Model.)

J. J. COBB.
Fifth Wheel for Vehicles.

No. 241,120.            Patented May 10, 1881.

Witnesses:
Dennis L. Rogers
James A. Rogers

Inventor:
John J. Cobb
By E. A. Burlingame
his atty in fact

UNITED STATES PATENT OFFICE.

JOHN J. COBB, OF GRAND RAPIDS, MICHIGAN.

FIFTH-WHEEL FOR VEHICLES.

SPECIFICATION forming part of Letters Patent No. 241,120, dated May 10, 1881.

Application filed December 7, 1880. (Model.)

*To all whom it may concern:*

Be it known that I, JOHN J. COBB, of Grand Rapids, Michigan, have invented a new and useful Improvement in Running-Gear for Wheeled Vehicles; and I hereby declare that the following is a full, clear, and exact description of the invention, reference being had to the accompanying drawings, and to the letters of reference marked thereon, which form a part of this specification.

This invention has for its object to furnish an improved running-gear for wheeled vehicles, so arranged as to entirely dispense with the ordinary fifth-wheel and head-block, by substituting in their stead the peculiar-shaped plates, constructed of suitable metal, hereinafter described.

Figure 1:
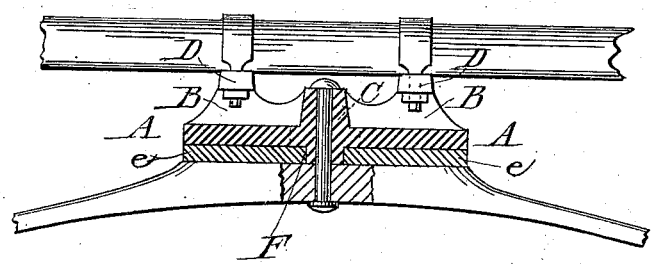
Figure 2:
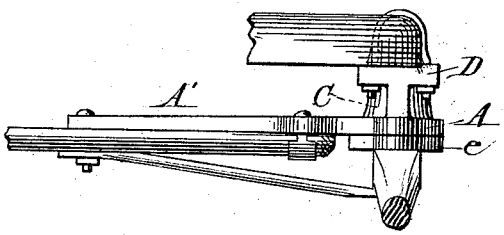

In the drawings, Figure 1 is a front elevation, partly in section; and Fig. 2 is a side view.

A represents one of my plates, which I call the "upper plate," having a smooth surface upon the bottom, (except for the projection hereinafter described,) and having a continuation, A', from the center backward, at right angles with plate A, for the support of the reach, to which it is attached, and having risers B B, supporting clip-ties D D, the object of which risers and clip-ties is to level the gear and sustain the body of the buggy by furnishing a support for the front cross-bar, which cross-bar is attached to the clip-ties D D by clips or other suitable means; also, upon the center of plate A is an elongated king-bolt bearing, C, which projects upward and downward from the upper and lower surfaces of plate A.

The lower projection exactly fits and fills a corresponding socket in the lower plate, e, at F, in which socket the lower projection moves as the vehicle turns; the object of which king-bolt bearing is the strengthening of the apparatus and lessening the wear. The lower plate, e, rests upon the top of the axle-tree stock, to which it is securely attached, and presents its flat upper surface, with the socket F, to the lower flat surface of A; and the king-bolt, passing through the bearing C, connects the two plates, pressing them together, thus constituting my improved gear. These plates may be made of any suitable metal, both malleable iron and brass having been successfully used by me—the upper plate of malleable iron and the lower of brass.

What I claim to have invented is, in running-gear for vehicles, a fifth-wheel constructed and arranged as above described.

What I desire to secure by Letters Patent is—

1. In a fifth-wheel in running-gear for wheeled vehicles, constructed and arranged as above described, risers B B, resting on plate A and supporting clip-ties D D.

2. In running-gear for wheeled vehicles, the combination, in a fifth-wheel constructed and arranged as above described, of clip-ties D D and risers B B, attached to and supported by plate A.

JOHN J. COBB.

Witnesses:
DENNIS L. ROGERS,
EDWIN A. BURLINGAME.